United States Patent [19]
Parker

[11] Patent Number: 6,125,541
[45] Date of Patent: Oct. 3, 2000

[54] DEVICE AND METHOD FOR CLOSING A MOVABLE SOCKET AND ESTABLISHING A PREDETERMINED WEAR INDICATOR DISTANCE

[75] Inventor: Glen C. Parker, St. Peters, Mo.

[73] Assignee: Moog Automotive Products, Inc., St. Louis, Mo.

[21] Appl. No.: 09/175,915

[22] Filed: Oct. 20, 1998

[51] Int. Cl.$^7$ ............................. B21D 53/10; B21D 39/00; B23P 11/00; B23P 11/02
[52] U.S. Cl. ................................. 29/898.051; 29/441.1; 29/446; 29/522.1; 29/283.5; 403/27
[58] Field of Search .................................. 29/441.1, 446, 29/522.1, 898.051, 520, 283.5; 403/27, 76, 132, 135, 143

[56] References Cited

U.S. PATENT DOCUMENTS

| | | | |
|---|---|---|---|
| 3,318,645 | 5/1967 | Sutowski | 29/520 |
| 3,602,980 | 9/1971 | Heffner | 29/522.1 |
| 3,791,748 | 2/1974 | Goodrich, Jr. et al. | 403/27 |
| 3,813,178 | 5/1974 | Herbenar et al. | 403/27 |
| 3,857,149 | 12/1974 | Hassan | 29/441.1 |
| 3,890,052 | 6/1975 | Herbenar et al. | 403/27 |
| 3,909,920 | 10/1975 | Cornish et al | 29/522.1 |
| 3,958,411 | 5/1976 | Bernt | 29/522.1 |
| 4,017,197 | 4/1977 | Farrant | 403/27 |
| 4,070,121 | 1/1978 | Graham . | |
| 4,477,714 | 10/1984 | Zorn et al. | 29/520 |
| 4,478,531 | 10/1984 | Levinson et al. | 403/77 |
| 4,569,126 | 2/1986 | Weber | 29/525 |
| 4,723,350 | 2/1988 | Kobayashi et al. | 29/520 |
| 4,749,299 | 6/1988 | Swanson | 403/27 |
| 4,783,985 | 11/1988 | LaBarge et al. | 29/522.1 |
| 4,823,454 | 4/1989 | Mills | 29/520 |
| 5,127,156 | 7/1992 | Yokoyama et al. | 29/522.1 |
| 5,155,897 | 10/1992 | Schleicher | 29/522.1 |
| 5,509,749 | 4/1996 | Eifert et al. | 403/132 |
| 5,517,743 | 5/1996 | Liebig et al. | 29/522.1 |

*Primary Examiner*—David P. Bryant
*Attorney, Agent, or Firm*—Polster, Lieder, Woodruff & Lucchesi, L.C.

[57] ABSTRACT

An assembly technique and device for enclosing an open end of a movable socket (10) comprised of fully hardened materials with an expanding cover-plate (66) and for positioning the cover-plate at a predetermined distance from an exposed pressure plate (62) of the movable socket so as to provide a reliable indicator of socket wear. During assembly, various internal components of the movable socket, including the pressure plate, are installed within a housing (12) through a posterior opening (16) with the cover-plate is positioned over the components. A two-stage ram (100) having first and second contact surfaces (142, 167) is brought into engagement with the cover-plate. Pressure exerted by the two-stage ram is transferred to the cover-plate through the first surface, expanding the cover-plate into a generally planar configuration and enclosing the internal components within the socket housing. A continued increase in pressure extends the second contact surface into engagement with the cover-plate, further deforming the cover-plate to a predetermined final position relative to an internal component for a consistent indication of wear on the socket components within the housing.

14 Claims, 8 Drawing Sheets

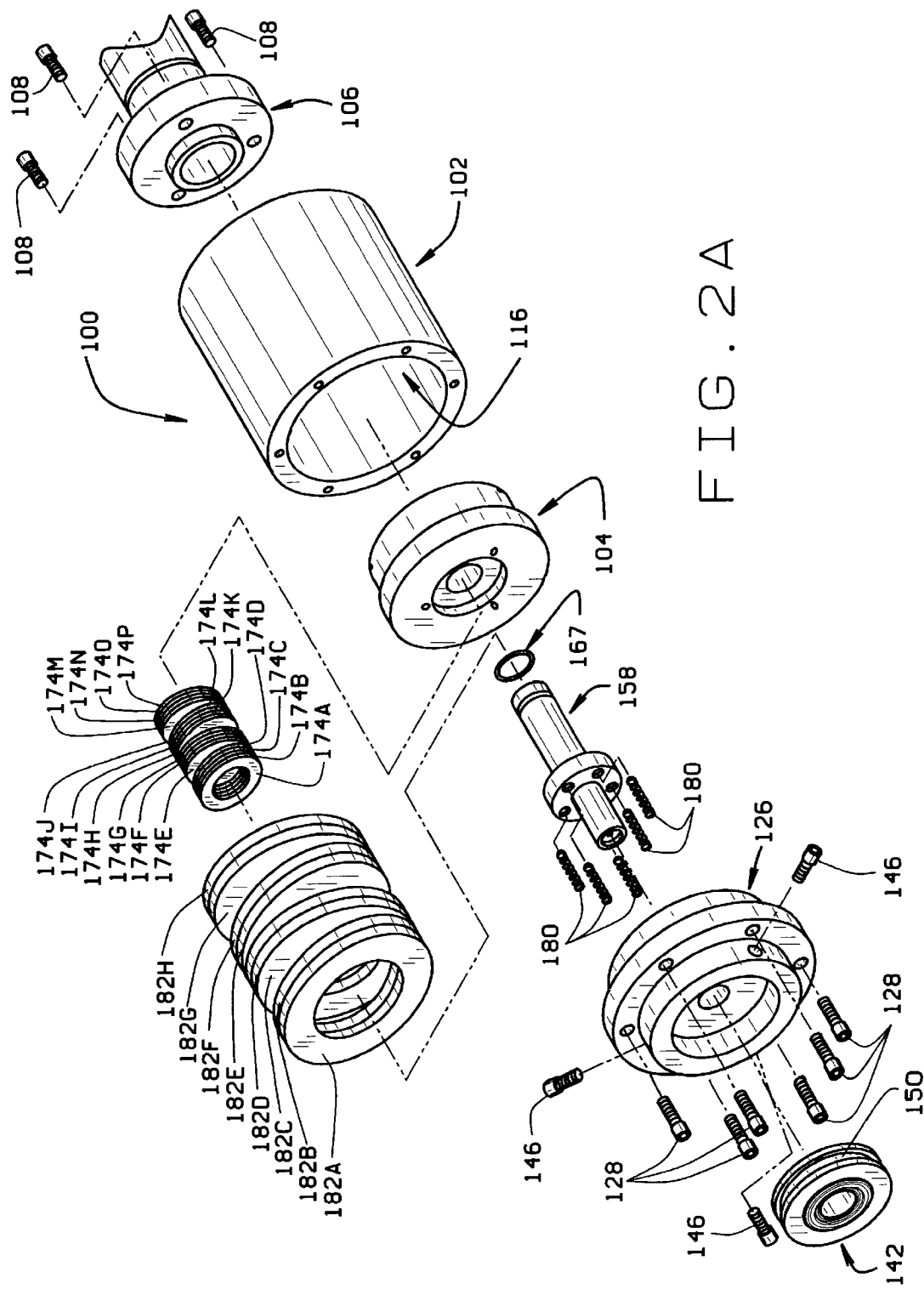

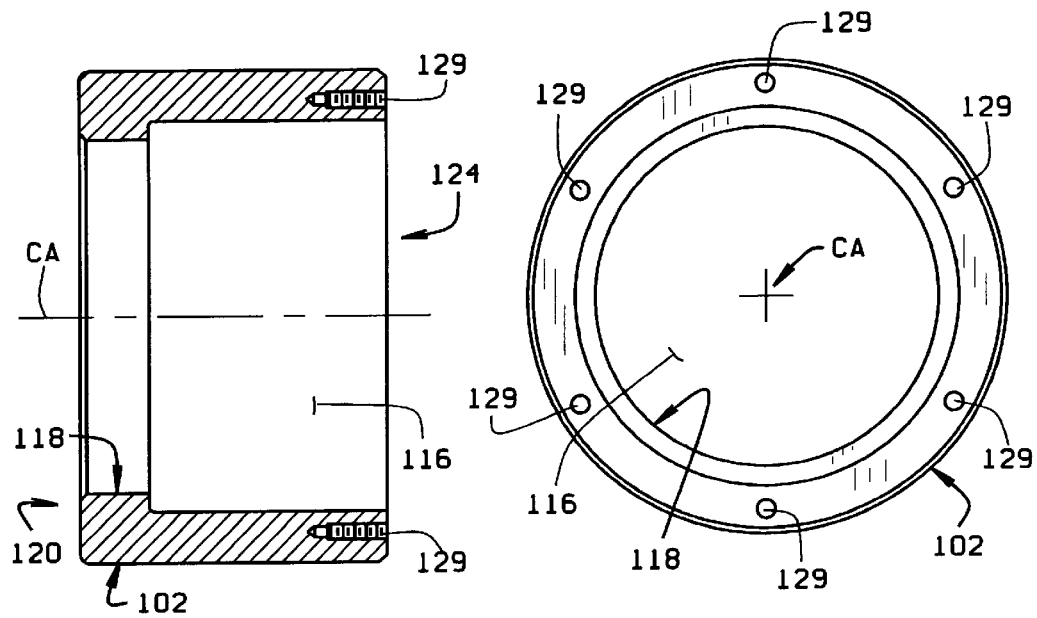
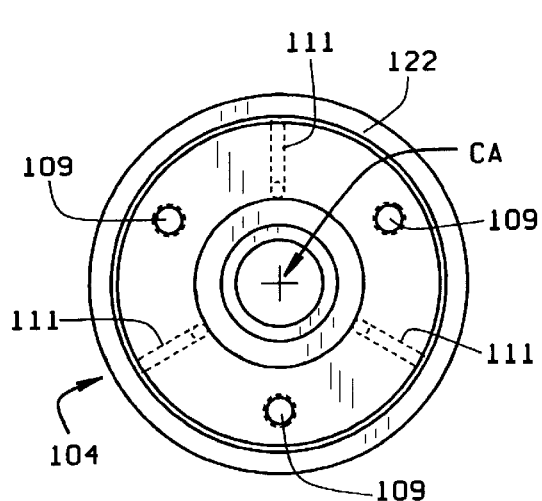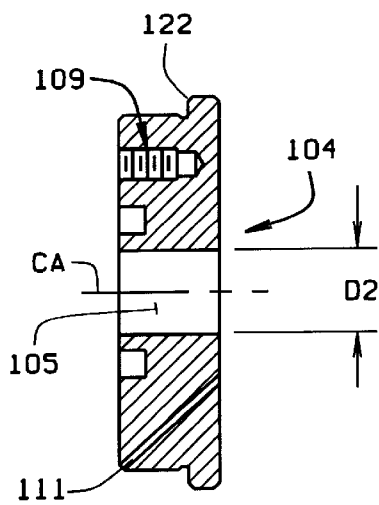

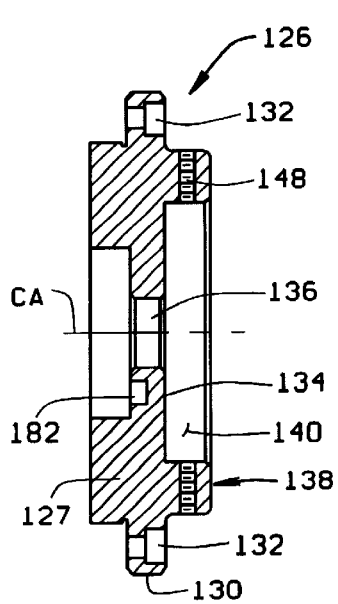
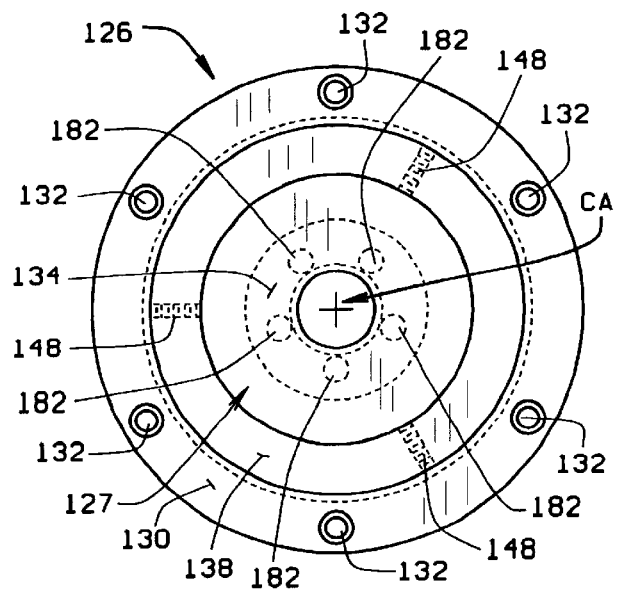
FIG. 5A    FIG. 5B
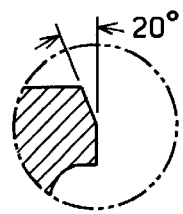
FIG. 6B
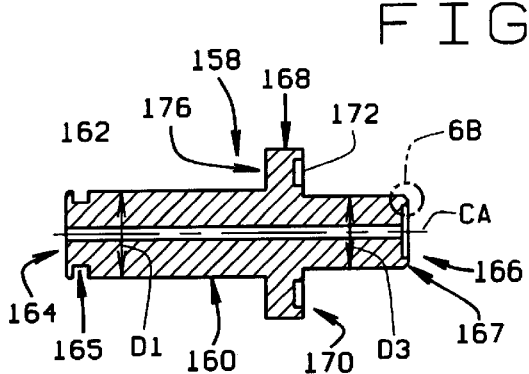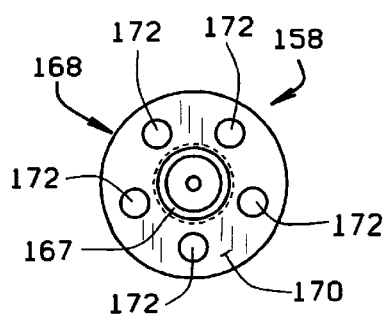
FIG. 6A    FIG. 6C

DEVICE AND METHOD FOR CLOSING A MOVABLE SOCKET AND ESTABLISHING A PREDETERMINED WEAR INDICATOR DISTANCE

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to the manufacturing and assembly of movable sockets, for example, ball-joints as used in automotive steering and suspension systems, and more particularly, to a method and device for performing dual operations of closing one end of a movable socket without spinning, swaging, or welding, by means of an expanding cover-plate, and for setting a desired wear indicator distance between the surface of the expanding cover-plate and a pressure plate enclosed within the socket. While the invention is described in detail with respect to automotive applications, those skilled in the art will recognized the broader applicability of the invention.

Conventional ball-joints, and other movable sockets are used, for example, in automotive steering and suspension applications. The sockets comprise a housing having a circular cylindrical internal surface, a ball stud with a ball head contained in the housing, and a synthetic resin or sintered alloy bearing member supporting the ball head within the housing. These components are installed into the housing through a posterior opening, with the ball stud extending outward through an axially disposed anterior opening of a smaller diameter than the ball head. Traditionally, the posterior opening is closed by means of a cover-plate, spun, swaged, or welded in place. Once secured in place, the cover-plate presses on the bearing member either directly or indirectly through a resilient rubber intermediate component and a pressure plate.

Bearing components within the housing, against which the ball head or moveable component is articulated, perform best when the housing material is fully hardened, as it is better able to withstand the stresses and frictional wear associated with movement of the bearing components. Accordingly, the use of hardened materials greatly extends the useful life of the bearing components and the housing. However, hardened material surfaces greatly hinder traditional spinning, sagging, or welding operations required to enclose the housing. Therefore, as described in co-pending U.S. patent application Ser. No. 09/167,917, (herein incorporated by reference) a method and device for expanding a conical or convex cover-plate within the posterior opening is employed to secure and enclose the socket components within the socket housing, allowing for closure of a fully hardened housing without the need for traditional spinning, sagging, or welding operations.

Once assembled, movable sockets may be utilized as load carrying members in numerous mechanical systems, including automotive vehicle suspension and steering systems. Obviously, movable sockets or ball-joints employed in these applications are subjected to various operating conditions, and may be required to carry substantial loads. When wear develops, the performance of the movable socket or ball-joint degrades and, in the case of automotive applications, may result in erratic steering or excessive looseness and play in the vehicle suspension system.

As described in U.S. Pat. No. 4,070,121 to Graham, it is know to manufacture movable sockets and ball-joints with exposed wear indicators extending through the cover-plate so as to be in position to provide a visual indication of the wear condition of the ball-joint components. As the ball-joint components wear over time due to friction, the position of the exposed wear indicator shifts, corresponding to changes in the distance between the cover-plate and the inner components of the ball-joint. Traditionally, the distance between the outer surface of the cover-plate and the internal pressure plate of the ball-joint is utilized to determine the amount of wear experienced by the socket. To ensure an accurate wear indication, this distance is set, with a minimal part-to-part variation, to a predetermined tolerance by a secondary press or machining operation after the closure of the movable socket or ball-joint by the traditional spinning, swaging or welding operations.

Accordingly, it is highly advantageous to develop a ram device capable of both expanding a conical or convex cover-plate within a socket housing to enclose the housing without the need for specialized spinning, swaging, or welding operations, and for establishing the distance between the expanded cover-plate and the socket pressure plate at a predetermined reference for wear indication in a single machining operation.

BRIEF SUMMARY OF THE INVENTION

Among the several objects and advantages of the present invention are:

The provision of an apparatus for expanding a conical or convex cover-plate to secure socket components within a socket housing and for establishing the cover-plate at a predetermined position to provide an indication of socket component wear in a two-stage continuous operation;

The provision of the aforementioned apparatus wherein a first contact surface expands the cover-plate within the housing, and a second contact surface independently establishes the expanded cover-plate at the predetermined wear-indicating position;

The provision of the aforementioned apparatus wherein the first and second contact surfaces are concentricly mounted within a ram housing;

The provision of a method for use of the aforementioned apparatus wherein the cover-plate expansion operation and the cover-plate positioning operation are integrated into a two-stage continuous pressing operation;

The provision of the aforementioned method of use wherein the cover-plate expansion operation is a first stage operation, and the cover-plate positioning operation is a second stage or sequential operation; and The provision of the aforementioned apparatus and method which simplifies the assembly and manufacture of movable sockets to close tolerances while providing minimal unit-to-unit variations.

Briefly stated, the present invention features an assembly technique for enclosing an open end of a movable socket comprised of fully hardened materials with an expanding cover-plate and for positioning the cover-plate at a predetermined distance from internal components of the movable socket so as to provide a reliable indicator of socket wear. During assembly, various internal components of the movable socket, including a pressure plate, are installed within a housing through a posterior opening and a conical or convex cover-plate is positioned over the components within the posterior opening. A ram of the present invention having concentric contact surfaces is brought into engagement with the cover-plate. Pressure exerted by the ram is transferred to the cover-plate through an outer concentric surface, expanding the cover-plate into a generally planar configuration and enclosing the internal components within the socket housing. Once the cover-plate has expanded, a continued increase in pressure exerted by the ram extends a inner concentric contact surface into engagement with the cover-plate, deforming the cover-plate to a predetermined final position. The predetermined final position of the expanded cover-plate provides a reference plane for a consistent indication of wear on the socket components within the housing.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 2A is an exploded perspective view of a two-stage assembly tool of the present invention;

FIG. 3A is a side sectional view of a cylindrical housing for an two-stage assembly tool of the present invention;

FIG. 3B is an anterior end view of the cylindrical housing shown in FIG. 3A;

FIG. 4A is an anterior end view of a housing adapter for an two-stage assembly tool of the present invention;

FIG. 4B is a side sectional view of the housing adapter shown in FIG. 4A;

FIG. 5A is a side sectional view of a mounting adapter for an two-stage assembly tool of the present invention;

FIG. 5B is an anterior end view of the mounting adapter shown in FIG. 5A;

FIG. 6A is a side sectional view of a second stage deflection ram for an two-stage assembly tool of the present invention;

FIG. 6B is an enlargement of a portion of FIG. 6a indicated at line 6B—6B illustrating the beveled anterior lip;

FIG. 6c is an anterior end view of the second stage deflection ram of FIG. 6a;

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what we presently believe is the best mode of carrying out the invention.

Figures 1, 1A:
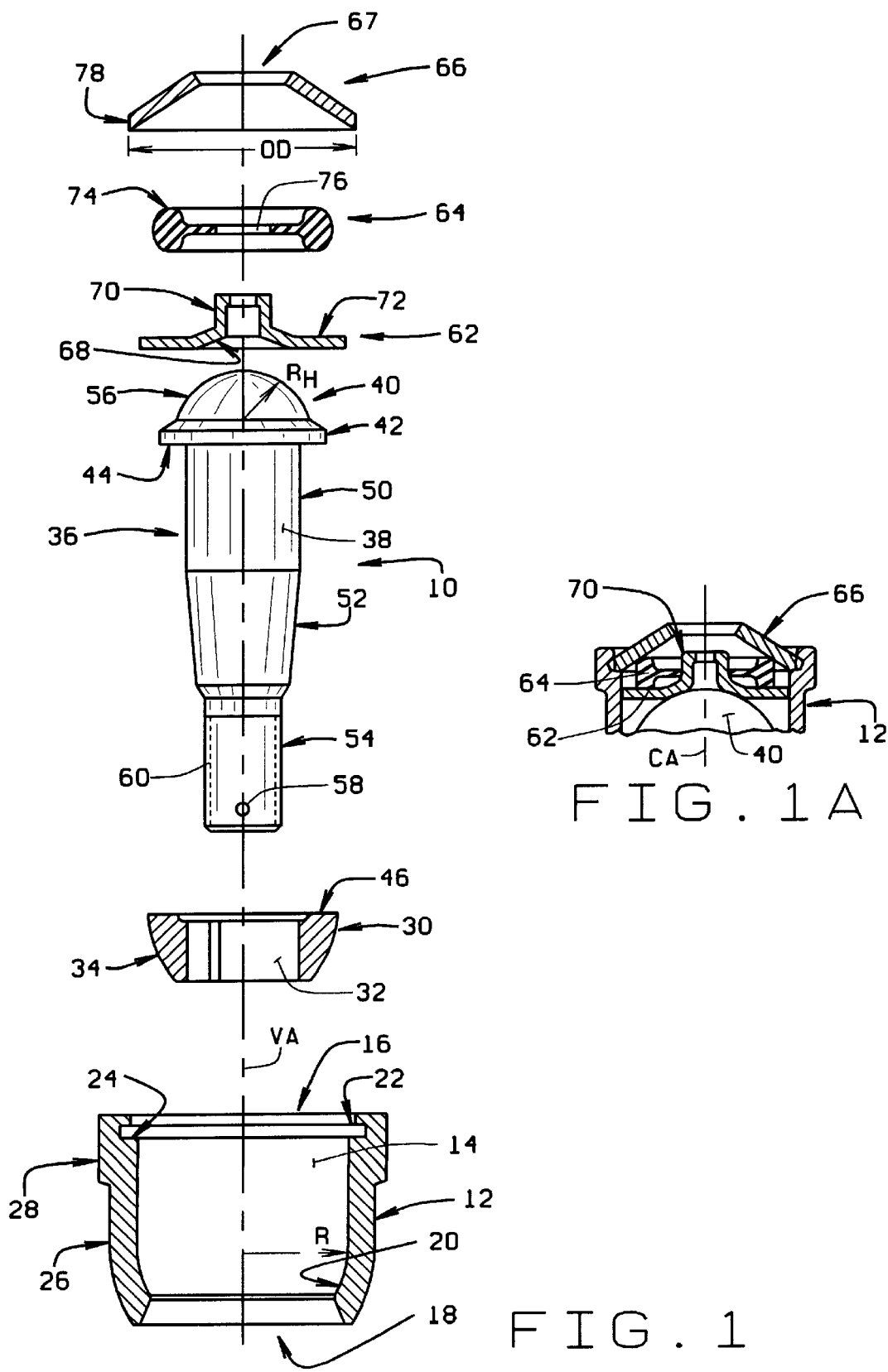
FIG. 1 is an exploded view of one illustrative embodiment of a movable socket assembly employing the expanding cover-plate of the present invention.
FIG. 1A is a partial view illustrating the movable socket of FIG. 1A, with the upper end components in-place, prior to expansion of the cover-plate.

Referring generally to FIGS. 1 and 1A the two-stage expanding cover-plate assembly method of the present invention may be used to enclose a movable socket, such as the ball-joint shown at 10, within a housing 12 without the need for spinning, swaging, or welding. Those skilled in the art will readily recognize the applicability of the following method to the assembly of a variety of different movable sockets; to facilitate the description of the method and devices used in conjunction therewith, the preferred embodiment of present invention is described in reference to a ball-joint 10, but is not limited to use therewith.

Housing 12, within which the various internal components of the ball-joint are enclosed, is generally cylindrical, with a central bore 14 of non-uniform radius having a posterior opening 16 and an anterior opening 18. The radius R of central bore 14 decreases to define a curved surface 20 at the base of the housing, adjacent anterior opening 18. A counterbore 22 having a circumferential groove 24 is formed in bore 14, adjacent the posterior opening 16. The exterior surface 26 of housing 12 may follow the general contour of the central bore 14. In the embodiment illustrated, the surface 26 has an expanded ridge 28 formed in it. The ridge 28 is used for attachment of ball-joint 10 to other components (not shown). As may be appreciated, the ridge 28 also may be adapted for other specific kinds of installations employing threads or other connectors (not shown).

To assemble ball-joint 10, a bearing 30 sized to fit within central bore 14 is seated within housing 12. The bearing 30 includes a central bore 32 axially aligned with a vertical axis VA of the housing, and a curved outer surface 34 of bearing 30 is designed to correspond to the curvature of surface 20 in housing 12.

Next, a stud 36 having a generally cylindrical body 38 and an enlarged head portion 40 with a circumferential flange 42 is passed through central bores 32 and 14, such that the underside 44 of flange 42 rests on an upper surface 46 of the bearing seated within the housing. The body 38 includes a uniform diameter upper portion 50 adjacent flange 42, a tapered central portion 52, and a lower portion 54 of a narrow uniform diameter. The upper portion 50 is sized to fit within the central bore 32 of bearing 30, with the central portion 52 and lower portion 54 extending through the anterior opening 18, externally of housing 12. The head portion 40 includes a hemispherical surface 56 with a radius RH greater than that of upper portion 50, but less than radius R of the housing 12. When assembled, the hemispherical surface 56 and the curved outer surface 34 define a generally spherical unit within housing 12, allowing for conical movement of stud 36. Those skilled in the art will readily recognize that numerous shapes and configurations for stud 36 and bearing 30 are possible. For example, the stud 36 may include a generally spherical head, eliminating the need for bearing 30, or the cylindrical body may include threads (not shown), bores as at 58, or grooves as at 60, for attachment of external components (not shown).

Once stud 36 and bearing 30 are seated within the housing, a pressure plate 62 and rubber cushion 64 are placed within central bore 14, above hemispherical surface 56, and secured therein by an expanding cover-plate 66 having an axial bore 67 as described below. The pressure plate 62 sits on top of stud 36, and includes a curved indentation 68 having a radius of curvature corresponding to RH. In the preferred embodiment, a lubrication port 70 is formed in and extends upward along the center of the pressure plate 62. Port 70 permits the injection of a lubricant into the interior spaces of the assembled ball-joint 10. Rubber cushion 64 sits, in turn, on an upper surface 72 of pressure plate 62, and serves to hold the pressure plate 62 in place against the stud 36 while simultaneously permitting small movements in response to the conical movement of the stud. The rubber cushion includes an circumferential torus 74, having an axial hole 76 formed in it through which the lubrication port 70 extends. Finally, cover-plate 66, shown in an un-expanded conical configuration in FIG. 1, is placed above the rubber cushion 64 adjacent counter-bore 22, for vertical compression and lateral expansion as will be described, to seat within circumferential groove 24 and enclose the various components within housing 12. To facilitate the insertion of the cover-plate 66 within the posterior opening of housing 12, the cover-plate 66 includes a circumferential rim 78 having and outer diameter OD sized to fit within counter-bore 22, and axial bore 67 sized such that the lubrication port 70 of the pressure plate 64 may pass therethrough. FIG. 1A illustrates the arrangement of the ball-joint 10 components prior to the expansion of the cover-plate 66.

As indicated above, those skilled in the art will recognize that the various internal components of the moveable socket secured within the housing 12 by the cover-plate 66 may be varied in size and shape depending upon the particular application for which the movable socket is designed, and accordingly, the above described ball-joint 10 is merely exemplary of one embodiment. The assembly method described co-pending U.S. patent application Ser. No. 09/167,917 for installing the expanding cover-plate 66 is applicable to any movable socket wherein one end of the housing 12 must be enclosed to retain internal components in place.

Turning now to FIG. 2A through FIG. 6C, an improved two-stage assembly tool or ram for use with the expanding cover-plate 66 as described in the aforementioned co-pending application is shown generally at 100. The two-stage assembly tool 100 comprises a cylindrical housing 102 (FIGS. 3A and 3B) having a central axis CA, mounted concentric to a housing adapter 104 (FIGS. 4A and 4B). Housing adapter 104 includes an axially aligned passage 105, and is secured to a spin head adapter 106 by a number of retaining bolts 108 circumferentially spaced about the axis CA. Each retaining bolt 108 is secured to a threaded recess 109 in the housing adapter 104 through a threaded bore 110 in a circumferential flange 112 of the spin head adapter 106. In the preferred embodiment shown in FIGS. 2A and 2B, the spin head adapter 106 is configured with an external surface 114 for attachment to the driving member of a hydraulic or pneumatic press (not shown), and the housing adapter 104 is secured to the spin head adapter 106 by three equidistantly spaced identical retaining bolts 108. Additionally included within the housing adapter 104 are a number of ports 11, for the equilization of air-pressure within the two-stage assembly tool 100 and for the introduction of a lubricant thereto as required.

The cylindrical housing 102 of the two-stage assembly tool 100 includes a bore 116 concentric with the central axis CA and an inwardly-protruding circumferential shoulder 118 adjacent a posterior end 120 of bore 116. When assembled, as best see in FIG. 2B, the shoulder 118 seats against a circumferential flange 122 on the housing adapter 104, thereby retaining the housing portion 102 on the spin head adapter 106. The anterior end 124 of the housing 102 is enclosed by a mounting plate 126 (shown in FIGS. 5A and 5B) secured to the housing portion 102 by a number of identical countersunk cap screws 128 threaded into recesses 129. In the preferred embodiment, a total of six socket-head cap screws 128 are equidistantly spaced about the circumference of the anterior end 124.

The mounting plate 126 comprises a torus body 127 having a rectangular cross-section, and is configured with a number of flanges for attachment of various components. First, an outer circumferential flange 130 extends radially outward from the body 127 to seat on the anterior end 124 of the housing 102. The flange 130 includes a number of identical countersunk threaded bores 132 through which the identical cap screws 128 pass into the housing 102. Those skilled in the art will recognize that the number of bores 132 corresponds to the number of cap screws 128 utilized in retaining the mounting plate 126 to the housing 102. Extending radially inward from the body 127, an inner circumferential flange 134 defines an axial passage 136 through the mounting plate 126. Finally, a cylindrical flange 138 on the anterior surface of the body 127 defines a recessed mount 140 into which a removable stop-out plate 142 is secured.

As described in the co-pending U.S. patent application Ser. No. 09/167,917, stop-out plate 142, best shown in FIG. 2a, includes a working face 144 configured to deform a conical or convex cover-plate 66 into an essentially planar configuration and an enlarged axial bore 145. The stop-out plate 142 is secured within the recessed mount 140 by a number of identical cap screws 146, each threaded through identical radial bores 148 in the cylindrical flange 138 and into a receiving channel 150. In the preferred embodiment, as seen in FIG. 2a, a total of three cap screws 146 are equidistantly space about the central axis CA to retain the stop-out plate 142 within the recessed mount 140, however, one skilled in the art will recognized that greater or fewer numbers of cap screws may be employed within the scope of this invention, and that the receiving channel 150 may be replaced by a number of circumfrentially disposed receiving recesses (not shown).

Axially disposed within the bore 116 is a second stage deflector 158, shown in greater detail in FIG. 6A–FIG. 6C, having a cylindrical body 160 and a longitudinal bore 162 axially aligned with the central axis CA. A posterior end 164 of the body 160 configured to extend into the housing adapter axial passage 105 of the housing adapter 104, has an outer diameter D1 corresponding to the inner diameter D2 of the passage 105. A circumferential retaining groove 165 adjacent the posterior end 164 receives an O-ring washer 167.

An anterior end 166 of body 160, has a reduced diameter D3, and is configured to extend through the mounting plate axial passage 136 and partially into the enlarged axial bore 145 of stop-out plate 142. The anterior end 166 includes a circumferential lip 167, beveled outward at an acute angle, preferably 20 degrees as shown in FIG. 6B. A spring support flange 168 circumscribes the outer surface of the body 160 at the transition point between body diameters D1 and D3. Equidistantly spaced about an anterior surface 170 of the support flange, are a number of identical recessed spring seats 172, best seen in FIG. 6C. Those skilled in the art will recognize that the number of recessed spring seats may be varied within the scope of the invention.

Figure 2B:
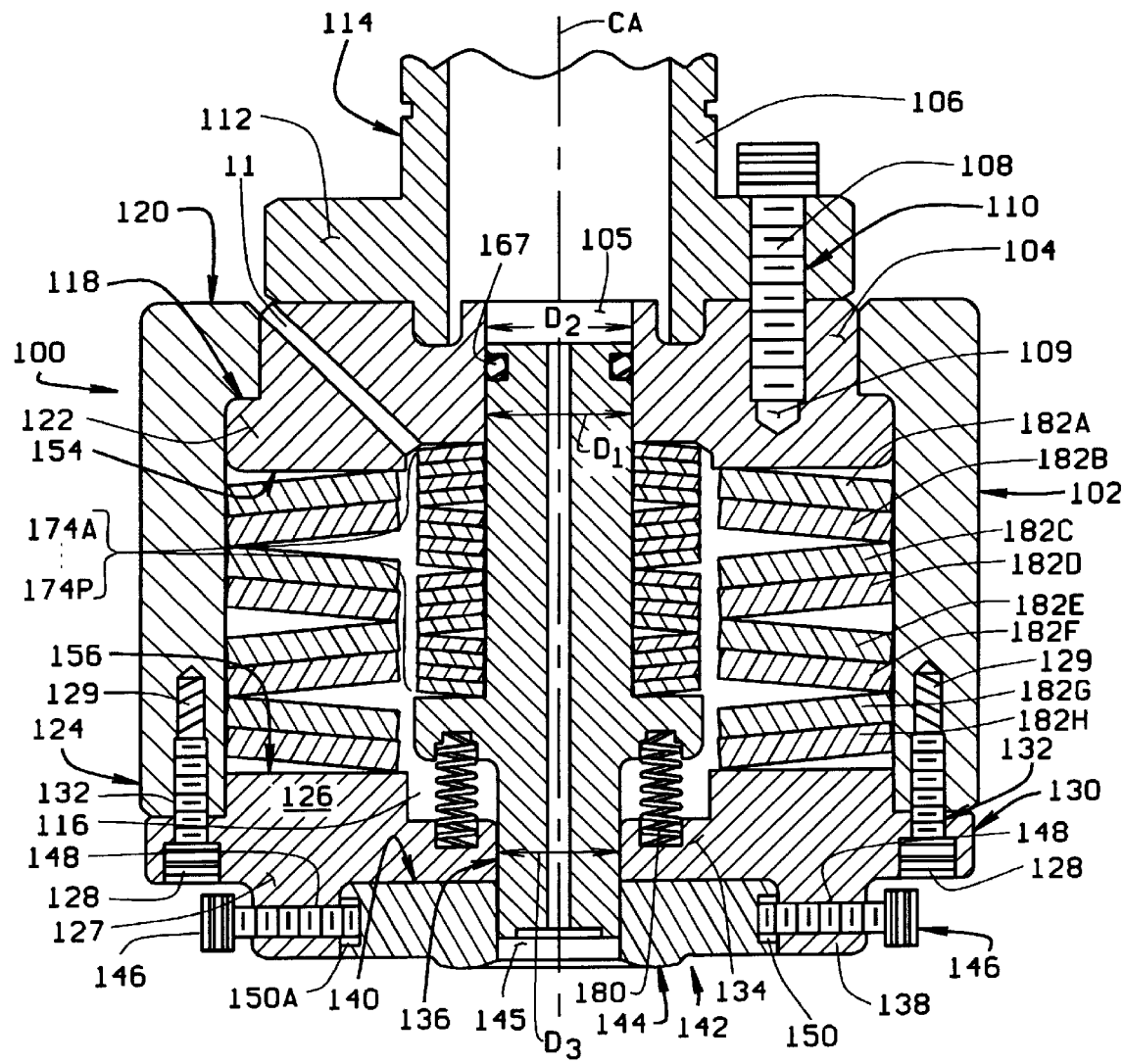
FIG. 2B is a sectional view of the two-stage assembly tool shown in FIG. 2A.

To provide for a compressive force acting on the second stage deflector 158, a number of compressible spring members 174A–174P are placed concentrically around the body 160, between the posterior end 164 and a posterior surface 176 of the spring support flange 168. When installed within the housing 102, the spring members 174A–174p seat between the posterior surface 176 and the housing adapter 104. In the preferred embodiment, the spring members 174A–174p are each individual bellville washers, rated for flat loads of 1,656 lbs. each, positioned in four groups of four. Each group is aligned opposite the adjacent groups as shown in FIGS. 2A and 2B, providing for a larger overall compression distance, while limiting the individual compression distance each spring member moves through. In the preferred embodiment, the resulting stack of spring members 174A–174p is rated at a load of 5,544 lbs., with a total compression distance of 0.140 inches.

To maintain the second stage deflector 158 in a withdrawn position in the enlarged axial bore 145 of stop-out plate 142, a number of expansion springs 180, each identical and preferably spiral wound springs, are placed parallel to the central axis CA, between the anterior surface 170 and the inner circumferential flange 134 of the mounting plate 126. The expansion springs 180 seat within the recessed spring seats 172 on the spring support flange 168 and axially aligned identical seats 182 on the mounting plate flange 134. It will be readily apparent to those skilled in the art that the number of seats 182 and 172 will correspond to the number of expansion springs 180 employed to support the second stage deflector 158. In the preferred embodiment illustrated, five expansion springs 180 are employed, and correspondingly, five pairs of seats are axially aligned and equidistantly arranged on the spring support flange 168 and the mounting plate flange 134. The operation of the compressible spring members 174A–174p and the expansion springs 180 will be described in detail below.

The final internal components of the two-stage assembly tool 100 comprise a number of large-diameter compressible spring members 182A–182H, coaxially disposed about the central axis CA within the housing bore 116, adjacent the inner surface of the cylindrical housing 102, as best seen in FIGS. 2A and 2B. These large-diameter compressible spring members are seated in a slightly compressed configuration between the posterior surface of the housing adapter 104 and the anterior surface of the mounting plate torus body 127 to provide a preload of about 2,800 lbs. on the mounting plate 126. In the preferred embodiment, the large-diameter spring members 182A–182H are each individual bellville washers, each flat load rated at 7,280 lbs., and positioned in four groups of two. Each group is aligned opposite the adjacent groups as shown in FIG. 2, providing for a larger overall compression distance, while limiting the compression distance each individual spring member moves through. In the preferred embodiment, the resulting stack of large-diameter compressible spring members 182A–182H is rated at 11,372 lbs., with 0.280 inches of compression distance. One skilled in the art will recognize that alternate types of compressible spring members, such as helically wound springs may be employed within the scope of the invention, provided the loading requirements are met. By slightly compressing or preloading the large-diameter compressible spring members 182A–182H, the expansion force of approximately 2,800 lbs. is directed coaxially along the central axis CA, urging the housing adapter 104 and mounting plate 126 in opposite directions. As is readily apparent from examination of FIG. 2, the mounting plate 126 is secured to the cylindrical housing 102, which is in turn seated against a surface of the housing adapter 104. The load on the posterior surface 156 of the mounting plate 126 is transferred to the housing 102 through the countersunk cap screws 128, causing the shoulder 118 of the housing 102 to seat securely against the circumferential flange 122 of the housing adapter 104. The expansion force thereby is seen to hold the housing 102 and associated components against the housing adapter 104.

Referring to FIG. 2A and 2B, assembly of the two-stage stop-out two-stage assembly tool 100 of the present invention begins with the cylindrical housing 102 and the housing adapter 104. The housing adapter 104 is placed within the housing 102, adjacent the posterior end, such that the circumferential flange 122 on the housing adapter seats against the should 118 of the housing 102. Next, the large-diameter compressible spring members 182A–182H are stacked within the housing bore 116, with one spring member 182A resting directly on the anterior surface of the housing adapter 104. Similarly, spring members 174A–174p are stacked within the remaining portion of the housing bore 116, inwardly concentric to the large-diameter compressible spring members 182A–182H, with one spring member 174A resting within the recessed shoulder 178 on the housing adapter 104.

With the spring members 174A–174p and 182A–182H stacked in place, the second stage deflector 158 and its associated O-ring washer 167 are seated within spring members 174A–174p, such that the posterior end 164 of the body 160 extends into the housing adapter axial passage 105, and the posterior surface of the spring support flange rests against spring member 174p. Expansion springs 180 are then seated within the recessed spring seats, 172A–172E on the anterior surface of the spring support flange.

To enclose the housing 102, the mounting plate 126 is axially aligned with the central axis CA and positioned against the anterior end 124 of the housing 102, compressing the large-diameter spring members 182A–182H and the expansion springs 180. Countersunk cap screws 128 are then threaded into the housing 102 through the mounting plate bores 132, securing the mounting plate in a fixed relationship with the housing and retaining the second stage deflector 158 within the housing bore 116 in such a manner to allow for a small degree of axial movement of the deflector. All axial movement of the second stage deflector 158 is restrained by the expansion springs 180 and the spring members 174A–174p.

The two-stage assembly tool 100 is next secured to the spin head adapter 106 by retaining bolts 108 threaded through bore 110 in the flange 112 of the spin head adapter and into the housing adapter 104. The final step in assembly the tool 100 is the selection and attachment of the removable stop-out plate 142. As is described in the co-pending U.S. application Ser. No. 09/167,917, the removable stop-out plate includes the working face 144 configured to deform a conical or convex cover-plate 66, and accordingly is selected to correspond to the size and shape of the cover-plate. The removable stop-out plate 142 is positioned axially within the recessed mount 140 on the mounting plate 126, and secured thereto by the placement of cap screws 146 threaded through the flange 138 of the mounting plate 126 and into the receiving channel 150 of the stop-out plate 142.

Figure 7:
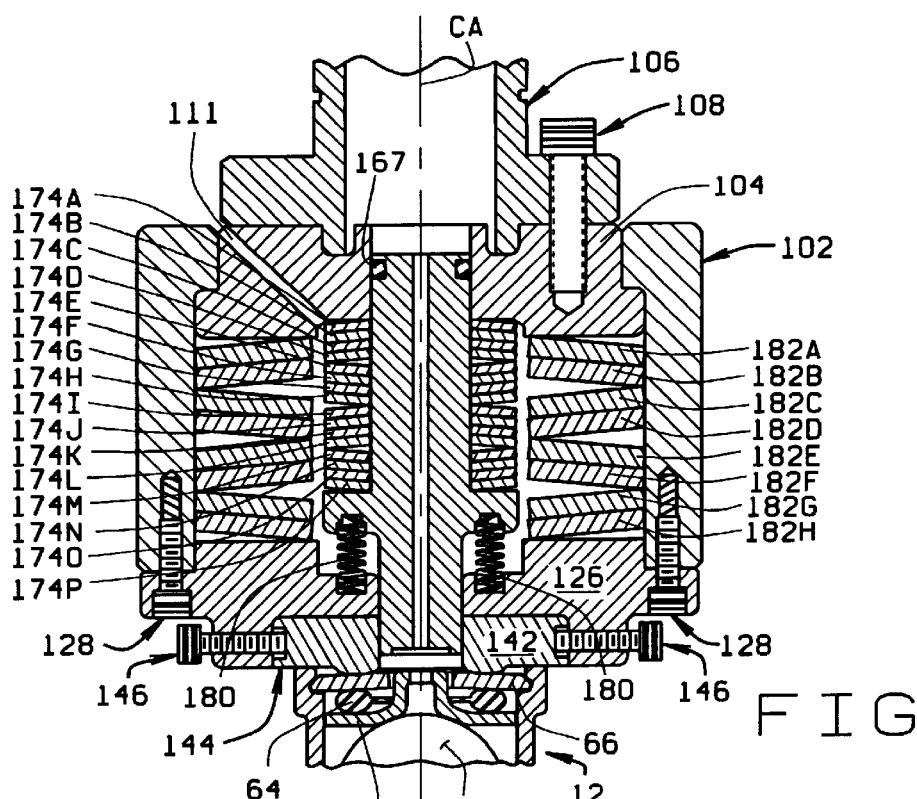
FIG. 7 is a section view similar to FIG. 2B, illustrating the working face of a removable stop-out plate is in engagement with a fully expanded cover-plate and the posterior opening shoulder of a ball-joint housing.

The two-stage assembly tool 100 as described above is utilized in the closure operations of a ball-joint 10 as follows. First, the internal components of the ball-joint 10 are stacked within the ball-joint housing 12 as described in the co-pending U.S. application Ser. No. 09/167,917, and positioned in axial alignment beneath the two-stage assembly tool 100, previously secured to a hydraulic or pneumatic press (not shown) by the spin head adapter 106. The initial operation of the two-stage assembly tool to close the ball-joint is as described in the co-pending application. A downward force is exerted by the hydraulic or pneumatic press, moving the working face 144 of the removable stop-out plate 142 into contact with the expanding cover-plate 66. A continued exertion of downward force by the hydraulic or pneumatic press shifts the housing adapter 104 in an axially downward direction relative to the cylindrical housing 102 of the two-stage assembly tool 100, compressing the large-diameter spring members 182A–182H. The downward force exerted by the press is now transferred through the spring members 182A–182H to the working face 144, and continues until such time as closure of the ball-joint 10 by expansion of the cover-plate 66 is completed as described in the co-pending application. In the preferred embodiment, the hydraulic or pneumatic press must exert at least a 6,555 lb. load on the cover-plate 66 to achieve the desired expansion and closure of the ball-joint 10. Upon full expansion of the cover-plate 66 and the closure of the ball-joint 10, the working face 144 contacts the upper surface of the counterbore 22 in the ball-joint housing 10, and is blocked from further downward movement, as shown in FIG. 7.

Figure 8A:
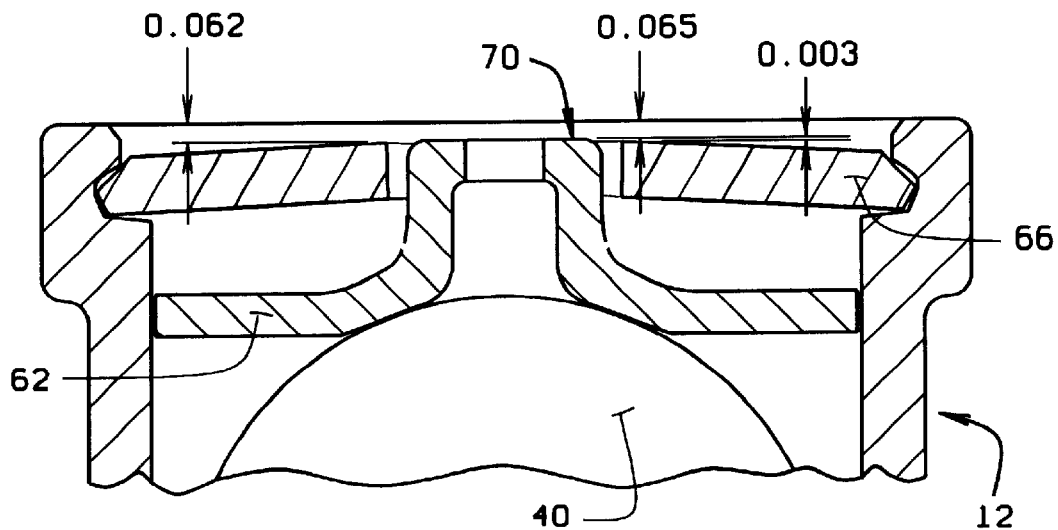
FIG. 8A is a sectional view of a movable socket after first-stage expansion of the coverplate by the working face of the removable stop-out plate, illustrating a high extreme of tolerance the expanded cover-plate and pressure plate positioning.
Figure 8B:
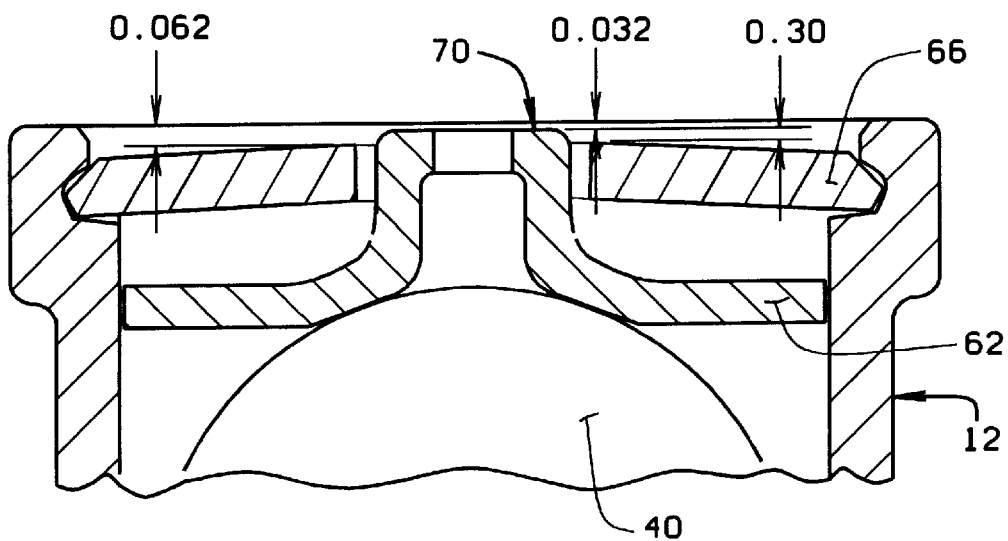
FIG. 8B is a sectional view similar to FIG. 8A, illustrating a low extreme of tolerance the expanded cover-plate and pressure plate positioning.
Figure 9:
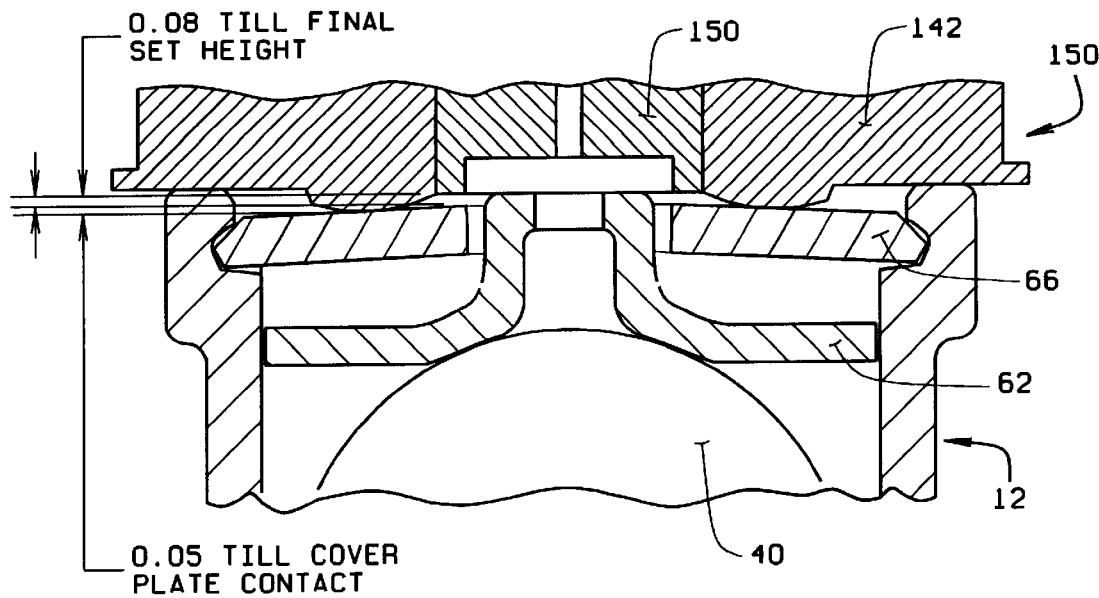
FIG. 9 is a view similar to FIGS. 8A and 8B, illustrating the relative positioning of ball-joint components and the two-stage assembly tool upon completion of the first-stage expansion process.

As shown in FIG. 8A–FIG. 9, the closure of the ball-joint housing 10 by the expanded cover-plate 66 results in some degree of dimensional variance from a high tolerance position (FIG. 8A) wherein the expanded cover-plate 66 may actually be equal to or slightly above the lubrication port 70 of the pressure plate 62, to a low tolerance position (FIG. 8B) wherein the expanded cover-plate 66 is slightly below the highest portion of the pressure plate 62. The dimensions included in FIG. 8A and FIG. 8B are exemplary. FIG. 9 illustrates the preferred dimensional relationships upon completion of the first stage cover-plate expansion process.

Figure 10:
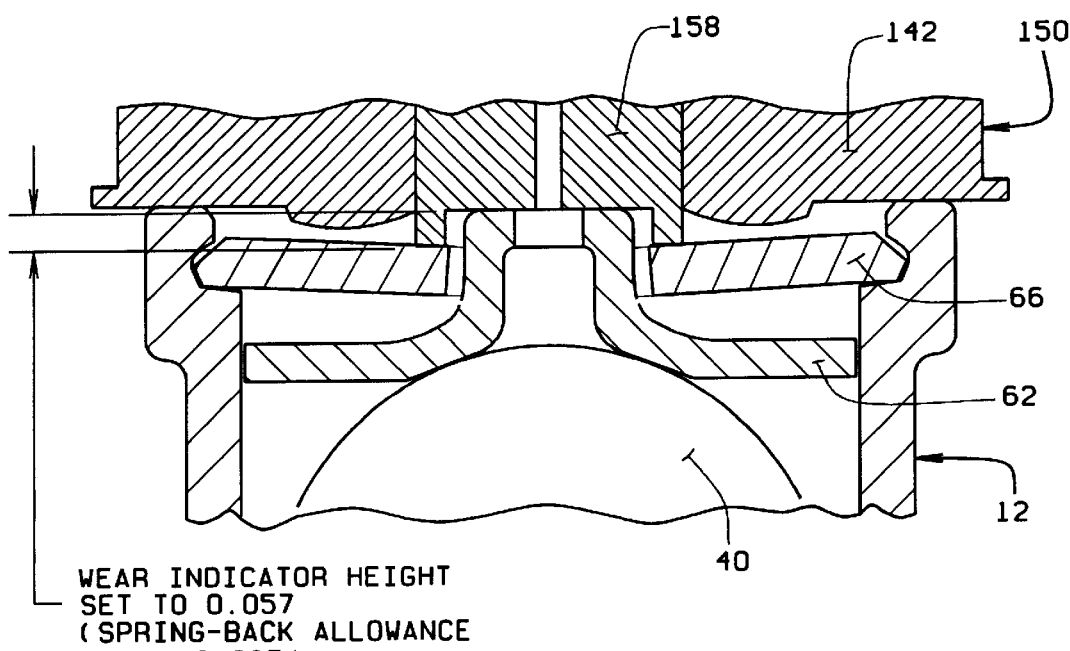
FIG. 10 is a view similar to FIG. 9, illustrating the relative position of the ball-joint components and the two-stage assembly tool upon completion of the second-stage deformation procession, prior to withdrawal of the second-stage deflection ram.

Accordingly, to establish a predetermined wear indicator distance between the expanded cover-plate 66 and the highest portion of the pressure plate 62, the hydraulic or pneumatic press continues to exert a downward load on the two-stage assembly tool 100, causing further compression of the large-diameter spring members 182A–182H. Since further downward movement of the mounting plate 126 is prevented by the blocked removable stop-out plate 142, the load is transferred from the housing adapter to the second stage deflector 158 through the spring members 174A–174p. The second stage deflector 158 moves axially downward within the cylindrical housing 102, such that the beveled circumferential lip 167 on the anterior end 166 of the deflector 158 contacts the expanded cover-plate 66, adjacent the exposed portion of the lubrication port 70. A continued increase in the downward force exerted by the press results in the compression of the spring members 174A–174p, and a further downward deformation of the expanded cover-plate 66 as the deflector 158 continues to move axially downward. The downward axial movement of the deflector 158, and the deformation of the expanded cover-plate 66 ceases when the anterior surface of the deflector 158 contacts the uppermost portion of the pressure plate 62, as shown in FIG. 10. In the preferred embodiment, a downward load of at least 16,900 lbs. and a no more than 20,100 lbs. must be exerted by the hydraulic or pneumatic press to achieve the desired final deformation of the expanded cover-plate 66.

Figure 11:
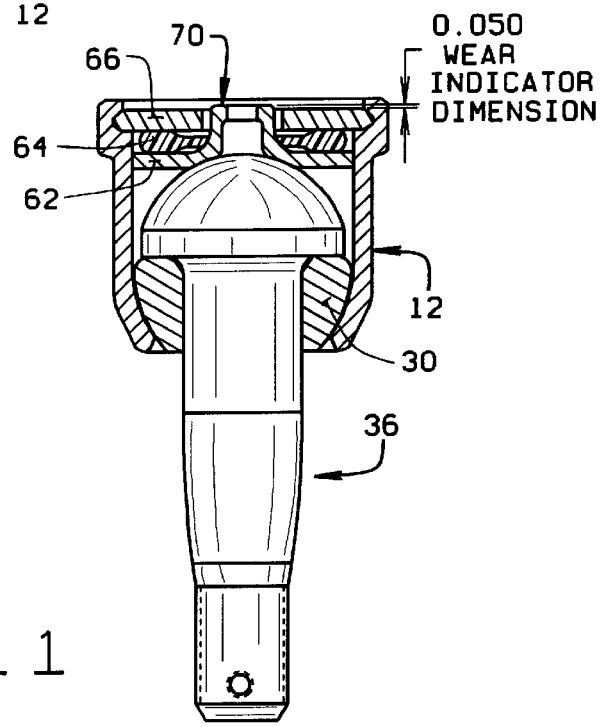
FIG. 11 is a side sectional view of a fully assembled movable socket after expansion of the cover-plate and establishment of the wear indicator distance by the tool and method of the present invention.

Upon completion of the deformation of the expanded cover-plate 66 by the second stage deflector 158, the load is withdrawn from the two-stage assembly tool 100, permitting expansion springs 180 to axially retract the deflector 158 within the cylindrical housing 102, and the removal of the two-stage assembly tool 100. As the deflector 158 is withdrawn from contact with the cover-plate 66, the cover-plate will spring back a small amount, and come to rest at a predetermined position relative to the uppermost portion of the pressure plate 62 as shown in FIG. 11. This distance, preferably 0.057 inches in the embodiments shown, is the wear indicator distance utilized by service personnel to determine if the ball-joint 10 has suffered excessive wear.

Those skilled in the art will recognize that the spring member loads requirements, and the final deformation of the expanded cover-plate 66, resulting in the predetermined wear indicator distance may be adjusted as required to achieve alternative wear indicator distances, or as required to achieve the appropriate deformation of the cover-plate 66 factoring material composition and component sizes.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A two stage ram cover-plate assembly tool adapted for use with a press machine, for deforming an expandable cover-plate to enclose one end of a movable socket housing having a protruding pressure plate, and to establish a predetermined wear indicator distance between said cover-plate and a portion of said pressure plate, comprising:

a cylindrical housing having a central axis;

a first adapter seated concentric to said central axis, adjacent a first end of said cylindrical housing, said first adapter having an axial bore of a first diameter and configured to secure said two-stage ram to said press machine;

a second adapter secured to said housing concentric to central axis and opposite said first adapter, said second adapter having an axial bore of a second diameter and configured to receive a removable stop-out plate configured to expand said cover-plate;

a working face on said removable stop-out plate for expanding said cover-plate under a first load;

a second-stage deflector axially disposed within said cylindrical housing, said second-stage deflector having a posterior end fitted with said first diameter axial bore of said first adapter, and an anterior end fitted within said second diameter axial bore of said second adapter, said anterior end configured to deform said cover-plate, said anterior end of said second stage deflector for deforming said cover-plate under a second and greater load to a predetermined position, a distance between said deformed coverplate in said predetermined position and an uppermost surface of said pressure plate corresponding to said predetermined wear indicator distance; and a plurality of compressible spring members disposed concentrically within said cylindrical housing, said compressible spring members preloaded to exert an expansive force on said first and second adapters.

2. The cover-plate assembly tool of claim 1 wherein said second stage deflector is restrained from axial movement by first and second sets of compressible spring elements, said first set of compressible spring elements interposed between said first adapter and said second stage deflector, and said second set of compressible spring elements interposed between said second stage deflector and said second adapter.

3. The cover-plate assembly tool of claim 2 wherein said second stage deflector is configured to extend axially beyond said removable stop-out plate responsive to an axial compression force on said first and second sets of compressible spring elements.

4. The cover-plate assembly tool of claim 2 wherein said second set of compressible spring elements comprises a plurality of spiral-wound compression springs aligned parallel to said central axis.

5. The cover-plate assembly tool of claim 2 wherein said first set of compressible spring elements comprises a plurality of bellville washers arranged in a plurality of aligned groups.

6. The cover-plate assembly tool of claim 5 wherein each of said aligned groups comprises four bellville washers, each group disposed in mirror-image relation to each adjacent group.

7. The cover-plate assembly tool of claim 1 wherein said anterior end of said second stage deflector includes a beveled flange concentric to said central axis, said beveled flange configured to deform said cover-plate.

8. The cover-plate assembly tool of claim 7 wherein said anterior end of said second stage deflector includes a recessed face to receive and upper surface of said protruding pressure plate upon deformation of said cover-plate to said predetermined wear indicator distance.

9. The cover-plate assembly tool of claim 1 wherein said compressible spring members are large-diameter bellville washers disposed in four adjacent sets.

10. The cover-plate assembly tool of claim 9 wherein each of said for adjacent sets comprises two stacked bellville washers, each set disposed in mirror-image relation to each adjacent set.

11. A method for enclosing one end of a movable socket within a housing having a protruding pressure plate with an expandable cover-plate having an axial bore, to establish said expandable cover-plate at a predetermined wear indicator distance from a portion of said pressure plate, comprising the steps of:

assembling internal components of said movable socket within said housing, with said expandable cover-plate disposed over said internal components;

positioning a two-stage assembly tool in axial alignment with said expandable coverplate;

exerting a load on said two-stage assembly tool such that a working face of said two-stage assembly tool moves along said alignment axis to contact said expandable cover-plate;

increasing said exerted load to axially displace said working face into contact with said housing, displacement of said working face expanding said expandable cover-plate into a generally planar configuration and enclosing said internal components within said housing of said movable socket such that an upper portion of said pressure plate extends above said expanded cover-plate through said axial bore;

deforming said expanded cover-plate beyond a predetermined wear indicator distance from said upper portion of said pressure plate by further increasing said exerted load and extending a second-stage deflector axially mounting within said two-stage assembly tool to contact said upper portion of said pressure plate with said second-stage deflector; and releasing said exerted load to remove said second-stage deflector and said working face from contact with said movable socket.

12. The method of claim 11 wherein increasing said exterted load on said two-stage assembly tool compresses a plurality of compressible spring members disposed within said two-stage assembly tool, transferring said exerted load to said working face.

13. The method of claim 11 wherein further increasing said exerted load compresses a plurality of compressible spring elements disposed within said two-stage assembly tool, transferring said further increased exerted load to said second-stage deflector, axially displacing said second-stage deflector relative to said working face.

14. The method of claim 11 wherein deforming said expanded cover-plate beyond a predetermined wear indicator distance accounts for spring-back of said deformed cover-plate upon releasing said exerted load, resulting in said deformed cover-plate positioned at said predetermined wear indicator distance relative to said upper portion of said pressure plate.

* * * * *